United States Patent

Mazdiyasni et al.

[15] 3,647,364

[45] Mar. 7, 1972

[54] PROCESS FOR PRODUCING HIGH-PURITY SUBMICRON BARIUM AND STRONTIUM TITANATE POWDERS

[72] Inventors: Khodabakhsh S. Mazdiyasni, Xenia; Richard T. Dolloff, Dayton, both of Ohio; Jonathan S. Smith, II, St. Louis, Mo.

[73] Assignee: The United States of America as represented by the Secretary of the Air Force

[22] Filed: Jan. 6, 1970

[21] Appl. No.: 1,007

[52] U.S. Cl. .................................... 23/51 R, 260/429.5
[51] Int. Cl. .................................................. C01g 23/00
[58] Field of Search ......................................... 23/51 R

[56] References Cited

UNITED STATES PATENTS

| | | | |
|---|---|---|---|
| 3,065,049 | 11/1962 | Bundy | 23/51 |
| 2,948,628 | 8/1960 | Wainer | 23/51 X |
| 2,985,506 | 5/1961 | Vita et al. | 23/51 |
| 3,413,083 | 11/1968 | Daendliker | 23/51 X |

FOREIGN PATENTS OR APPLICATIONS

| 569,081 | 1/1959 | Canada | 23/51 |
|---|---|---|---|

*Primary Examiner*—Herbert T. Carter
*Attorney*—Harry A. Herbert, Jr. and Cedric H. Kuhn

[57] ABSTRACT

Barium titanate and strontium titanate powders having a particle size in the range of 50 to 150 angstroms and a purity of 99.75 percent or higher are prepared by the hydrolytic decomposition of a barium or strontium alcoholate and a titanium alcoholate. The barium and strontium titanate powders are useful in the preparation of dense ferroelectric bodies, thin film electronic components, and piezoelectric materials.

5 Claims, 1 Drawing Figure

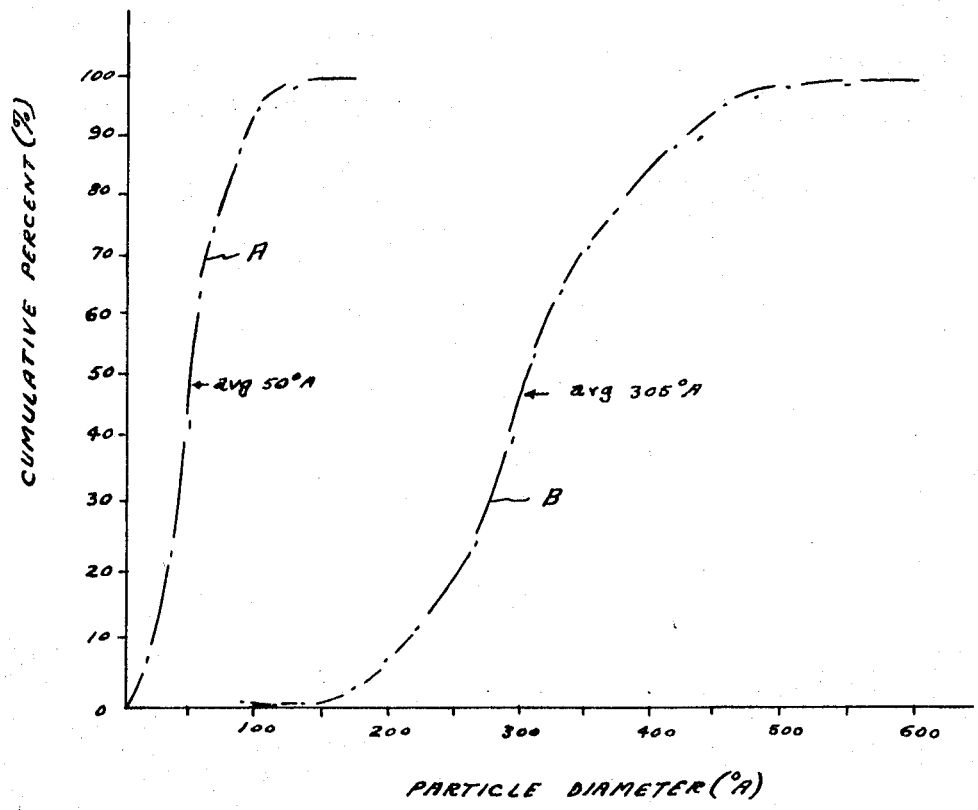

PROCESS FOR PRODUCING HIGH-PURITY SUBMICRON BARIUM AND STRONTIUM TITANATE POWDERS

This invention relates to barium and strontium titanates which are in the form of extremely pure powders having a submicron particle size. In one aspect it relates to a method for preparing such materials.

Stoichiometric, high purity, submicron barium and strontium titanate powders have long been of interest for use in the preparation of dense ferroelectric bodies, thin film electronic components, and piezoelectric materials. In the classical method of preparing fine ferroelectric ceramic powders, salts, such as oxalates, citrates and carbonates, are thermally decomposed to the oxides. Other prior art methods involve the thermal decomposition of sprayed mixed alcoholates to titanate crystals and the coprecipitation of titanate powders from inorganic salt solutions. While there is merit in each of these approaches, none appears to have been successful in producing stoichiometric titanates in a highly pure powder form of submicron size.

It is an object of this invention, therefore, to provide powders of barium and strontium titanates which are very pure and submicron in size.

Another object of this invention is to provide a method of producing high purity, submicron sized powders of barium and strontium titanates.

Other and further objects and advantages of the invention will become apparent to those skilled in the art upon consideration of the accompanying disclosure and the drawing which is a graph showing the particle size distribution of high purity barium titanate.

The present invention resides in a compound having the formula $MTiO_3$ in which M is barium or strontium, the compound being in the form of a powder composed of particles having a rectilinear, crystalline structure at room temperature as observed by electron microscope, and a particle size in the range of 50 to 150 angstroms and a purity of at least 99.75 percent. In one embodiment the invention lies in a process for preparing a compound having the aforementioned formula $MTiO_3$ which comprises (1) dissolving a compound having the formula $M(OR)_2$ and a compound having the formula $Ti(OR)_4$ in a solvent for the compounds, M being barium or strontium and R an alkyl radical, preferably containing one to six carbon atoms, or an aryl radical, (2) refluxing the resulting solution while subjecting the solution to stirring, (3) adding deionized, distilled water to the solution while continuing the stirring, thereby precipitating from solution a compound having the formula $MTiO_3$, (4) separating the precipitated compound from solution, and (5) drying the separated compound.

Any suitable method can be used in preparing the alcoholate having the formula $M(OR)_2$ that is used in the process of this invention. In a preferred method, barium or strontium metal is reacted with an alcohol to give a corresponding alcoholate. This reaction can be illustrated by the following equations in which barium or strontium metal are reacted with isopropyl alcohol to provide barium or strontium bis-isopropoxide:

(1) $Ba + 2C_3H_7OH \xrightarrow{82°C} Ba(OC_3H_7)_2 + H_2 \uparrow$ (2) $Sr + 2C_3H_7OH \xrightarrow{82°C} Sr(OC_3H_7)_2 + H_2 \uparrow$ It is to be understood that the other alcohols such as methyl, ethyl, propyl, isopropyl, butyl, isobutyl, amyl and hexyl alcohols can be utilized. Furthermore, aromatic alcohols such as benzyl, tolyl, phenylethyl, xylyl, and phenylpropyl alcohols, can be employed.

The titanium alcoholate can also be prepared by any suitable method. However, it is usually preferred to employ a two step method as illustrated by the following equations:

(3) $TiCl_4 + 4C_3H_7OH + 4NH_3 \xrightarrow[5°C]{C_6H_6} Ti(OC_3H_7)_4 + 4NH_4Cl$ (4) $Ti(OC_3H_7)_4 + 4C_5H_{11}OH \xrightarrow[24 \text{ hours}]{reflux} Ti(OC_5H_{11})_4 + 4C_3H_7OH$ As shown by equation (3), titanium tetrachloride in the first step is reacted in benzene with isopropyl alcohol in the presence of a base. The titanium isopropoxide which is separated, e.g., by fractional distillation, from the resulting reaction mixture is in the second step dissolved in amyl alcohol, and the resulting solution is refluxed for 24 hours as shown by equation (4). The product, namely, tetrakis tertiary amyloxide $[Ti(OC_5H_{11})_4]$ is separated from the reaction mixture, for example, by fractional distillation. As mentioned hereinbefore with relation to the barium and strontium alcoholates, it is likewise within the purview of the invention to use other alcohols in the preparation of the titanium alcoholate.

The materials used in the preparation of the intermediates, as exemplified by equations (1) through (4), are in a very pure state. Thus, it may be necessary to treat the materials to ensure that they are of a desired purity. For example, the alcohols may be treated with a dessicant, such as calcium hydride, and then fractionated at their respective boiling points.

As indicated hereinbefore, the alcoholates, i.e., the compounds having the formulas $M(OR)_2$ and $Ti(OR)_4$, are dissolved in a mutual solvent. Any material which serves as a medium for the reaction and is inert to the reaction can be used. For example, alcohols, such as isopropanol and isobutanol, can be utilized, and it is also within the scope of the invention to employ aromatic hydrocarbons such as benzene, toluene and the xylenes.

After dissolution of the alcoholates in the mutual solvent, the resulting solution is refluxed while at the same time stirring the solution. The reflux temperature varies with the particular reactants used, and it is well within the skill of the art to select an appropriate temperature. The solution is generally refluxed with stirring for a period in the range of from about 1 to 5 hours although longer and shorter periods of time can be employed.

After the period of reflux, deionized, distilled water is slowly added to the solution while stirring. Preferably, the water is distilled at least three times in order to remove as completely as possible minerals which could have an adverse effect upon the reaction. As a result of the water addition, a hydrolysis reaction occurs and the hydrate of barium or strontium titanate precipitates from solution.

The reaction, including the steps of refluxing and water addition, is carried out in a vacuum or in an inert atmosphere. It is particularly important that the reaction be conducted in an atmosphere free of carbon dioxide. Nitrogen and helium are examples of suitable inert gases that can be used to provide an inert atmosphere.

The precipitated hydrate of barium or strontium titanate is separated from the alcohols by any suitable means, such as by vacuum distillation. After separation, the hydrated titanate is dried in a vacuum or in a dry, inert atmosphere of, for example, nitrogen or helium. The drying conditions can vary within rather wide limits, for example, from about 40° to 120° C. for a period of from about 1 hour to 24 hours. The product recovered from the drying step is stoichiometric barium titanate or strontium titanate in powder form having a particle size in the range of 50 to 150 angstroms and a purity of at least 99.75 percent. The separation and drying steps are also conducted under a vacuum or in an inert atmosphere free of carbon dioxide. It is also within the scope of this invention to prepare barium-strontium titanate complexes and mixtures of barium titanate and strontium titanate by the present process.

In preparing the intermediates as well as the products of this invention, stoichiometric amounts of the various reactants are utilized. These amounts can be readily determined by one skilled in the art, particularly in view of the equations disclosed herein.

A more complete understanding of the invention can be obtained by referring to the following illustrative examples which are not intended, however, to be unduly limitative of the invention.

EXAMPLE I

A run was carried out in which 1.1 grams of recrystallized, high purity barium bis-isopropoxide [$Ba(OC_3H_7)_2$] and 1.87 milliliters of fractionated titanium tetrakis tertiary amyloxide [$Ti(OC_5H_{11})_4$] were dissolved in isopropyl alcohol. These two intermediates were prepared by the procedures described hereinabove. The solution was refluxed for 2 hours with vigorous stirring. Thereafter, while the stirring was continued, drops of deionized, triply distilled water were slowly added to the stirred solution. Hydrated barium titanate precipitated quantitatively from the solution as a result of simultaneous hydrolytic decomposition of the alkoxides according to the reaction:

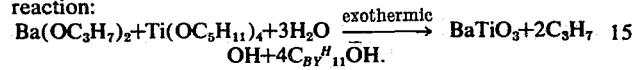

$$Ba(OC_3H_7)_2 + Ti(OC_5H_{11})_4 + 3H_2O \xrightarrow{exothermic} BaTiO_3 + 2C_3H_7OH + 4C_5{}^tH_{11}OH.$$

The reaction was conducted in a helium atmosphere that was free of carbon dioxide. The hydrated barium titanate, which was separated from the alcohols by decantation, was then dried in a vacuum at 50° C. for 12 hours. As shown hereinafter, the product was a stoichiometric barium titanate in finely divided form having a particle size of 50 to 150 angstroms and a purity greater than 99.98 percent.

The particle size of the barium titanate powder was determined by electron microscopy of a dispersion of the powder in a solution of 0.75 percent parlodion in amyl acetate sprayed onto a carbon substrate on a copper mesh screen. The electron micrograph at X60,000 (actual magnification without enlargement) showed the rectilinear symmetry of the very fine particulates.

The particle size distribution curves for particles greater than 10A. in diameter as measured with the electron microscope are shown in the single figure of the drawing. The resolution of the electron microscope was consistently better than 7A. Curve A is the distribution curve for the product as prepared while curve B is the distribution curve for the same product which had been calcined at 700° C. for 60 minutes. As seen from curve A, the largest particle observed was 150A. in diameter, the mean particle size was approximately 50A., and 90 percent of the particles were less than 100A. in diameter. Curve B shows that the mean particle size for the calcined powder increased to 305A. and that 80 percent of the particles were less than 350A. in diameter. In Table I hereinafter are tabulated the results of the emission spectroscopic analysis of the starting materials. The increased purity obtained through the successive steps of the preparation of the alkoxides and the decomposition to the $BaTiO_3$ was completely unexpected. Most of the impurities, with the exception of silicon, were eliminated through the synthesis steps. The elements listed do not include all of those analyzed for but represent those for which the most significant reductions in concentration were observed. None of the unlisted impurities was higher in concentration than those shown in Table I for $BaTiO_3$ after synthesis, nor was any increase over initial impurity content observed during the processing to $BaTiO_3$.

and 48 hours using $CuK\alpha$ radiation. The results are shown below in Table II.

TABLE II
X-ray diffraction data

| Uncalcined 50° C., d(A.) | Calcined 700° C., 4 h., d(A). | Calcined 700° C., 48 h., d(A.) |
|---|---|---|
| 4.320 vw [1] | 4.353 vw | 4.355 vw |
| 4.022 vw | 4.020 vw | |
| 3.952 vw | 3.970 w | 3.978 w |
| | 3.486 vw | |
| | 3.099 vw | 3.121 w |
| 2.836 vs | 2.814 vs | 2,814 vs |
| 2.315 s | 2.301 s | 2.307 s |
| 2.013 s | 1.998 s | 1.998 s |
| 1.797 w | 1.784 w | 1.777 w |
| 1.645 s | 1.629 s | 1.631 s |
| 1.418 w | 1.412 s | 1.414 s |
| 1.340 vw | 1.328 w | 1.331 w |
| 1.230 vw | 1.263 s | 1.263 s |
| 1.209 vw | 1.204 w | 1.204 w |
| 1.1715 vw | 1.1532 w | 1.1538w |
| 1.1133 vw | 1.1072 vw | 1.1067 vw |
| 1.0767 w | 1.0690 s | 1.0685 s |

[1] vs=very strong, s=strong, w=weak, and vw=very weak.

From Table II it is seen that the X-ray diffraction pattern for the sintered material is substantially identical with the X-ray pattern of the $BaTiO_3$ powder as prepared at 50° C. A slight shrinkage of the lattice occurred with increased calcination time, an effect consistent with an increase in crystallinity with degree of calcination. In view of the reported calcination temperatures of 500° to 700° C. required by prior art methods to prepare crystalline $BaTiO_3$, it was unexpected when, at slightly higher than room temperature, highly crystalline, submicron $BaTiO_3$ was obtained by the method of this invention.

EXAMPLE II

A run was carried out in which strontium titanate ($SrTiO_3$) was prepared, following a procedure similar to that described in Example I. Thus, a solution of 1.0 gram of strontium bis isopropoxide and 1.95 milliliters of titanium tetrakis tertiary amyloxide was prepared and refluxed at 85° C. for 5 hours in accordance with the following equation:

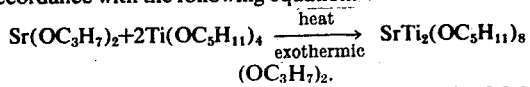

$$Sr(OC_3H_7)_2 + 2Ti(OC_5H_{11})_4 \xrightarrow[exothermic]{heat} SrTi_2(OC_5H_{11})_8 (OC_3H_7)_2.$$

At this stage of the process, the solid compound $Sr(OC_3H_7)_2$ was completely dissolved in and reacted with the liquid compound $Ti(OC_5H_{11})_4$ to form the complex shown in the above formula. Upon addition of deionized triply distilled water while vigorously stirring the complex, the strontium titanate powder was formed. The hydrated strontium titanate precipitated quantitatively.

The submicron precipitate containing excess water was recovered under a helium atmosphere and then placed in a vacuum drying oven at 110° C. for 8 hours. The strontium titanate powder was composed of particles having a size similar to that of the barium titanate prepared in Example I.

TABLE I
Emission spectrographic analysis of $BaTiO_3$ from barium and titanium alkoxides

| Elements | Ba (p.p.m.) | $TiCl_4$ (p.p.m.) | $Ba(OC_3H_7)_2$ (p.p.m.) | $Ti(OC_5H_{11})_4$ (p.p.m.) | $BaTiO_3$ (p.p.m.) |
|---|---|---|---|---|---|
| Si | 50 | 100 | <20 | nd<10 | 100 |
| Fe | 400 | 300 | nd<10 | 20 | <100 |
| Sr | 900 | [1] nd<5 | <100 | <100 | nd<30 |
| Ca | 500 | <100 | <100 | 10 | <100 |
| Ni | <50 | nd<3 | nd<3 | nd<3 | nd<5 |
| Mg | 80 | nd<3 | <50 | nd<3 | nd<30 |
| Na | <1,000 | 500 | nd<10 | nd<10 | nd<10 |
| Cu | <40 | nd<3 | nd<5 | nd<10 | <30 |
| Mo | 100 | nd<3 | <20 | nd<10 | <30 |
| Mn | 100 | nd<3 | <50 | nd<10 | <30 |
| Sn | 150 | nd<3 | <30 | nd<10 | <30 |
| Cr | <50 | nd<3 | <30 | <300 | <30 |
| Zr | 80 | 150 | nd<10 | nd<5 | nd<5 |
| Al | <80 | 300 | nd<5 | nd<5 | nd<10 |

[1] nd< stands for "Not detected less than."

X-ray diffraction studies were conducted of the $BaTiO_3$ powder as prepared and after calcining at 700° C. for 4 hours The emission spectrographic analysis of the strontium titanate powder indicated that it had a purity greater than 99.75 percent. The major impurities were silicon and barium in the range of less than 500 p.p.m.

The strontium titanate had a rectilinear crystalline structure, and no appreciable change was observed upon calcination up to 750° C. The two basic infrared modes of vibration recorded at 565 cm.$^{-1}$ and 400 cm.$^{-1}$ are in excellent agreement with values reported in the literature for strontium titanate powder.

As will be evident to those skilled in the art, various modifications of this invention can be made in view of the foregoing disclosure without departing from the spirit or scope of the invention.

We claim:

1. A process for preparing high purity, submicron, stoichiometric barium and strontium titanates which comprises the steps of:
   a. dissolving in a solvent therefor stoichiometric amounts of titanium tetrakis tertiary amyloxide and a compound selected from the group consisting of barium bis isopropoxide and strontium bis isopropoxide;
   b. refluxing the resulting solution consisting of said amyloxide, said compound and said solvent while stirring said solution, said refluxing being conducted under a vacuum or in an inert atmosphere;
   c. terminating the refluxing of said solution and adding thereto while stirring a stoichiometric amount of deionized, distilled water, the addition of the water being carried out under a vacuum or in an inert atmosphere, thereby precipitating from solution a compound selected from the group consisting of barium titanate and strontium titanate;
   d. separating said precipitated compound under a vacuum or in an inert atmosphere;
   e. drying said precipitated compound by heating same under a vacuum or in an inert atmosphere at a temperature from about 40° to 120° C. for a period of from about 1 to 24 hours; and
   f. recovering from the drying step stoichiometric barium titanate or strontium titanate in the form of a powder having a particle size in the range of 50 to 150 angstroms, a purity of at least 99.75 percent and a rectilinear crystalline structure.

2. A process according to claim 1 in which said compound is barium bis isopropoxide and barium titanate is recovered from said drying step.

3. A process according to claim 1 in which said compound is strontium bis isopropoxide and strontium titanate is recovered from said drying step.

4. A process according to claim 1 in which said solution is refluxed for a period of from about 1 to 5 hours.

5. A process according to claim 1 in which said solvent is an alcohol or an aromatic hydrocarbon.